Patented Oct. 21, 1947

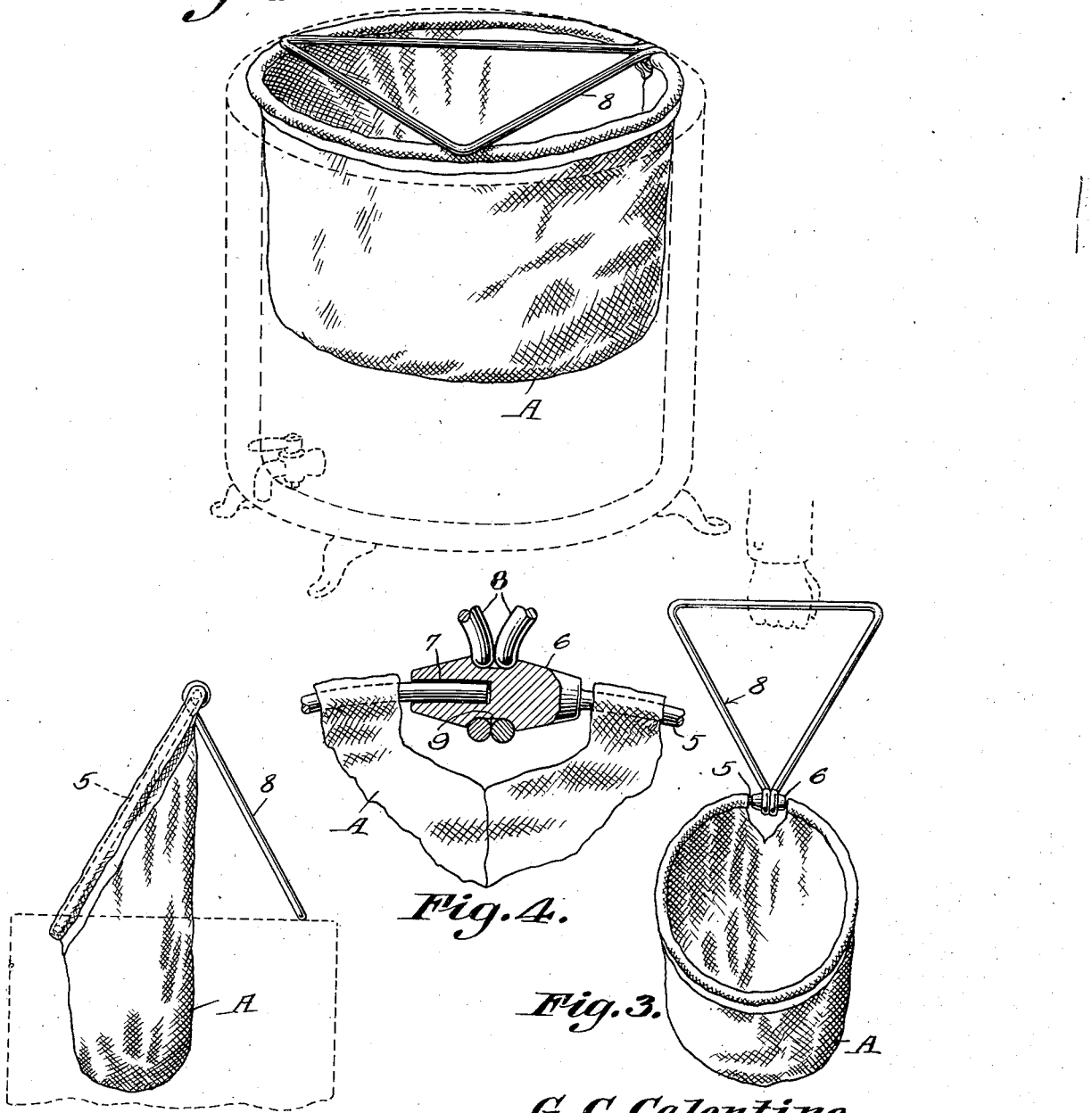

2,429,389

UNITED STATES PATENT OFFICE 2,429,389

COMBINATION URN BAG RING

George C. Calentine, Seattle, Wash.

Application April 4, 1945, Serial No. 586,531

2 Claims. (Cl. 248—94)

This invention relates to coffee urn bag rings and coffee urn bag ring supports, the primary object of the invention being to provide a bag ring of this character having a combined brace and carrying handle connected thereto, whereby the urn bag mounted on the ring, may be readily supported in a position to allow the coffee to drain therefrom, and then the brace used as a carrying handle, whereby the bag may be conveniently carried to a place where the coffee grounds in the bag may be removed therefrom, eliminating the possibility of the person removing the coffee grounds, burning his hands while handling the hot coffee rings now used in supporting coffee bags.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawing

Figure 1 is a perspective view illustrating a coffee bag ring and supports, constructed in accordance with the invention.

Figure 2 is an elevational view illustrating the bag and support moved to the draining position.

Figure 3 is a view illustrating the support used as a handle in carrying the bag to a place to remove the coffee grounds therefrom.

Figure 4 is an enlarged sectional view illustrating the manner of connecting the combined support and handle to the coffee bag ring.

Referring to the drawing in detail, the coffee bag ring is indicated by the reference character 5, the ring being provided with an enlargement 6. The bag ring is split, and this enlargement 6 is secured to one end of the split ring, the opposite end of the split ring being extended into the bore 7 formed in one end of the enlargement 6. The ring 5 being constructed of yieldable material, permits the loose end of the split ring 5 to be readily moved into or out of the bore 7. When it is desired to position the bag, which in the present showing is indicated by the reference character A, on the ring, the loose end of the ring is removed from the bore 7 and is threaded in the hem formed at the open end of the bag. The free end of the ring is now positioned in the bore 7 where it is securely held in place.

The reference character 8 indicates the combined support and handle, which is substantially triangular in formation, the ends of the combined support and handle being bent around the enlargement 6, where the ends of the material forming the combined support and handle, rest in the groove 9 formed intermediate the ends of the enlargement 6. Thus it will be seen that due to this construction, free rotary movement of the combined support and handle with respect to the bag ring 5, is permitted.

When the ring is being used to support a coffee bag within a coffee urn, during the process of making drip coffee, the ring and support are positioned within the urn, in a manner as shown by Fig. 1 of the drawing.

When it is desired to replenish the supply of coffee in the urn, the support 8 is moved to the position shown by Fig. 2 of the drawing, whereupon the coffee in the bag may drain therefrom. After the coffee has drained from the grounds in the bag, the support may now be moved to the position shown by Figure 3, where the wide section of the support provides a handle whereby the bag and hot coffee grounds contained therein may be readily carried to a place where the grounds may be emptied, without danger of the person handling the coffee bag, being burned by the heat and steam rising therefrom.

From the foregoing it is believed that the advantages and utility of applicant's combined support and handle will be apparent, and that a further description as to the use of the device is unnecessary.

What is claimed is:

1. A coffee urn bag ring comprising a split ring member, an enlargement secured at one end of the ring member, said enlargement having a bore adapted to receive the opposite end of the ring member, a substantially triangular support pivotally connected with the enlargement, said support providing a prop whereby the ring and urn bag supported thereon may be supported in an inclined draining position, and said support providing a handle whereby the urn bag and ring may be carried.

2. A coffee urn bag ring comprising a body portion on which a coffee urn bag is secured, a triangular supporting member pivotally connected with the ring at one corner of the supporting member, opposite corners of the supporting member adapted to normally rest on the body portion, said supporting member adapted to be moved to an inclined supporting position at the top of an urn, whereby coffee in the bag may drain therefrom, and said supporting member adapted to swing outwardly from the body portion, one section of the triangular supporting member constituting a handle whereby the ring and bag supported thereon may be carried.

GEORGE C. CALENTINE.

REFERENCES CITED

The following references are of record in the file of this patent:

UNITED STATES PATENTS

| Number | Name | Date |
|---|---|---|
| 658,848 | Hirsch | Oct. 2, 1900 |
| 1,057,385 | Simonson | Mar. 25, 1913 |
| 1,097,701 | Yount | May 25, 1914 |
| 1,320,905 | Osborne | Nov. 4, 1919 |
| 1,461,802 | McRoberts | July 17, 1923 |